Aug. 31, 1937.  J. H. JALBERT  2,091,547
INTERNAL COMBUSTION ENGINE WITH FUEL INJECTION
Filed May 9, 1935  9 Sheets-Sheet 1

Fig. 1ᵃ

Jean Henry Jalbert
INVENTOR
By his ATT'Y.

Aug. 31, 1937.  J. H. JALBERT  2,091,547
INTERNAL COMBUSTION ENGINE WITH FUEL INJECTION
Filed May 9, 1935  9 Sheets-Sheet 4

Jean Henry Jalbert
INVENTOR
By Otto Munk
his ATTY.

Fig. 5ª

Jean Henry Jalbert
INVENTOR

Fig. 7

Aug. 31, 1937.  J. H. JALBERT  2,091,547
INTERNAL COMBUSTION ENGINE WITH FUEL INJECTION
Filed May 9, 1935  9 Sheets-Sheet 9

Jean Henry Jalbert
INVENTOR
By Otto Munk
his ATTY.

Patented Aug. 31, 1937

2,091,547

UNITED STATES PATENT OFFICE 2,091,547

INTERNAL COMBUSTION ENGINE WITH FUEL INJECTION

Jean Henry Jalbert, Paris, France

Application May 9, 1935, Serial No. 20,538
In France May 24, 1934

4 Claims. (Cl. 123—56)

The object of the present invention is to assemble the cylinders of an internal combustion engine with fuel injection so as to render free of the stresses of explosion and compression, the casing located between the cylinders.

The invention is applied to an engine having an injection cylinder for each working cylinder, the injector piston sucking in and injecting a mixture of air and fuel rich in fuel.

Another object of the invention is to increase the mechanical strength of the engine whilst diminishing its weight.

A further object is to assemble longitudinally in a resilient manner the various parts of the casing of the engine whilst opposing flexion along the lines of the shafts.

A still further object is to mount the engine firmly.

An internal combustion engine with fuel injection according to the invention has the characteristics described in the following description and principally those set out in the claims annexed to the end of the description.

Preferred embodiments of the invention are illustrated by way of example on the accompanying drawings, in which:—

Fig. 6 is a transverse section of the engine of Figs. 5a and 5b, the portion on the left of the axis of the engine being on the line 6a—6a of Fig. 5a, whilst the portion on the right is on the line 6b—6b of Fig. 5a.

Figure 1A:
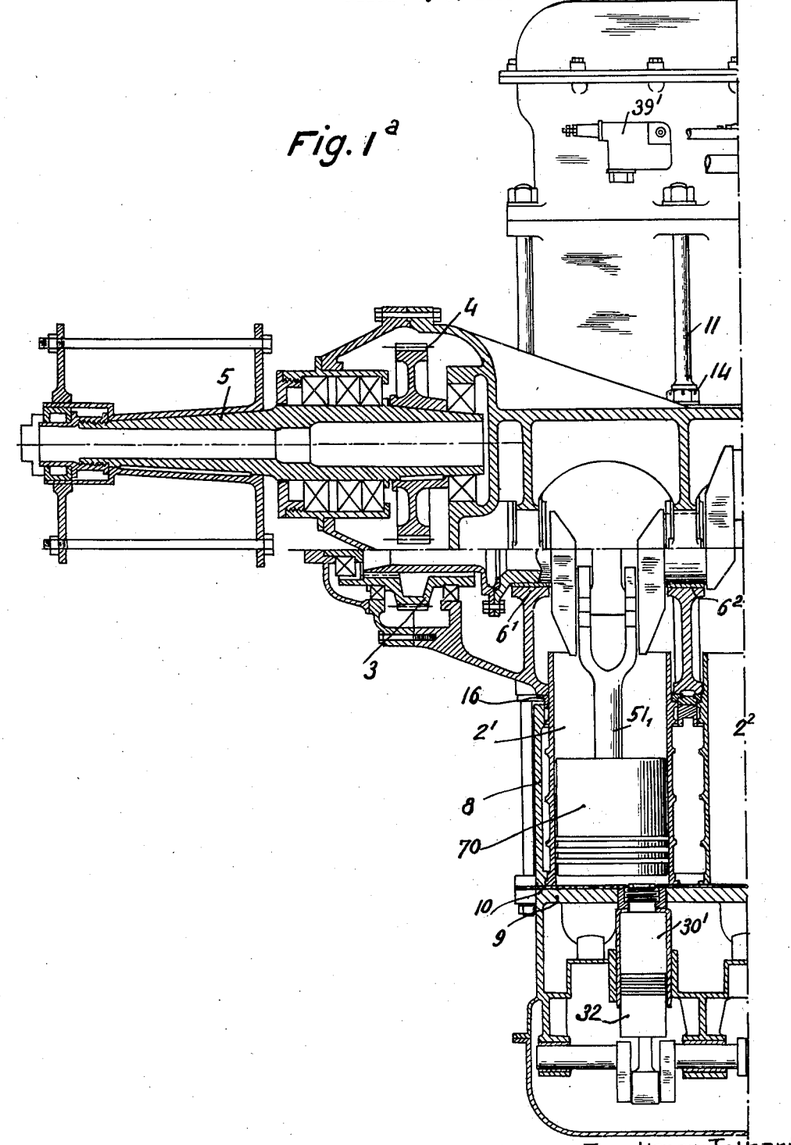
Figs. 1a and 1b are the two halves of a longitudinal section of an aircraft engine on the diverted line 1—1—1—1 of Fig. 2.
Figure 1B:
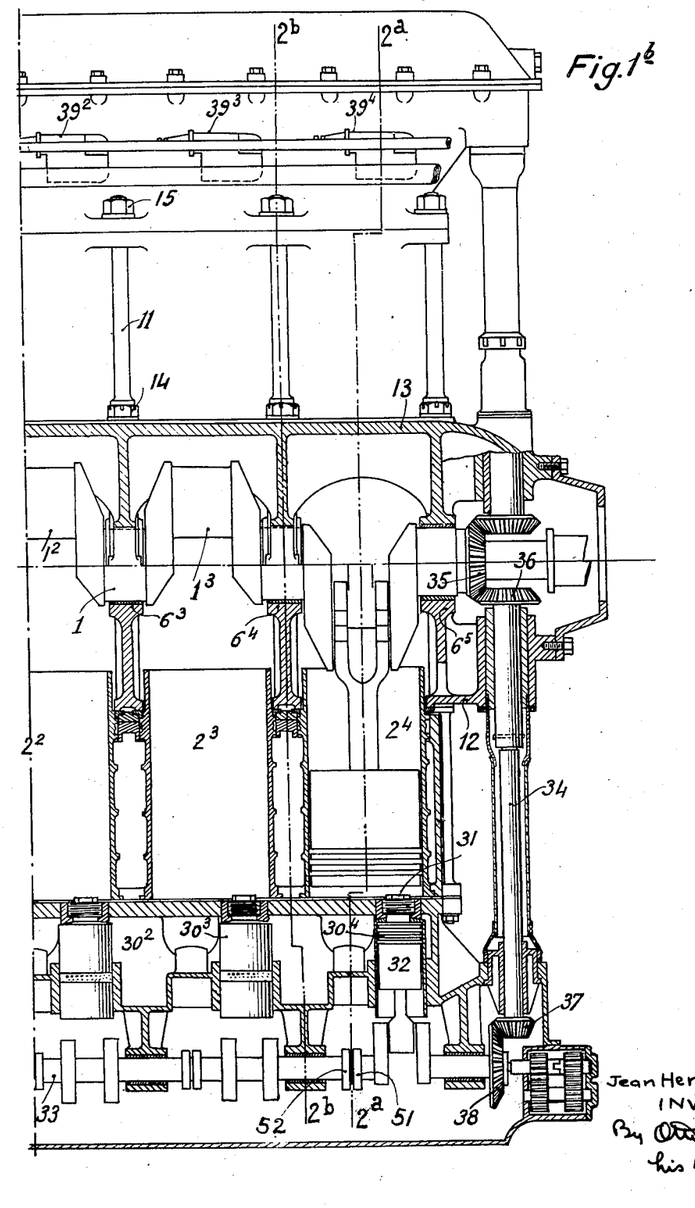
Figure 2:
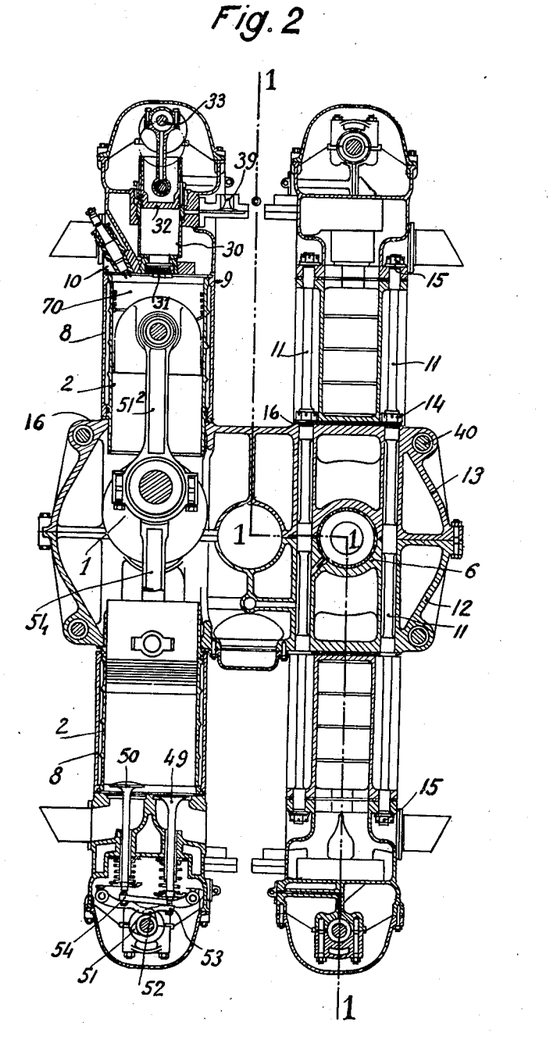
Fig. 2 is a transverse section of the motor, the portion on the left of the axis of the motor being on the line 2a—2a of Fig. 1b whilst the portion on the right is on the line 2b—2b of Fig. 1b.

The aircraft engine shown in Figs. 1a, 1b and 2 is a four-stroke injection engine, of H-section comprising sixteen cylinders divided into two banks of eight opposed cylinders, each bank being composed of two blocks of four cylinders $2^1\ 2^2\ 2^3\ 2^4$ so that when one cylinder is working in the explosion phase the opposed cylinder is working on the exhaust or the compression phase.

Each bank of eight cylinders has an engine crank-shaft 1.

The two engine crank-shafts 1 of the two banks of eight cylinders each have at one end a pinion 3 (Fig. 1a) which gears with a toothed wheel 4, fast on the air-screw shaft 5. Each engine crank-shaft 1 rotates in bearings $6^1\ 6^2\ 6^3\ 6^4\ 6^5$ in the casing.

Fuel is supplied by injection cylinders 30 communicating past valves 31 with the working cylinders 2. Injection pistons 32 which work in the injection cylinders 30 are driven by a crank-shaft 33 itself driven by the engine crank-shaft 1 through an intermediate shaft 34 and pinions 35, 36, 37 and 38 with a reduction ratio of 2:1. The shaft 33 also actuates the inlet and exhaust valves 49 and 50 by means of cams 51, 52 and rocker arms 53, 54 (Fig. 2).

Fuel supplied by nozzles $39^1\ 39^2\ 39^3$ . . . is first sucked together with air into the injection cylinder 30, the mixture is compressed in the cylinder and then, on automatic opening of the valve 31, passes into the motor cylinder 2 as the working piston 70 approaches top-dead-centre at the end of its compression stroke.

The whole of a group of four cylinders $2^1\ 2^2$ . . . is enclosed by a jacket 8 for the circulation of cooling water. A cylinder head 9 is joined to the working cylinders with an interposed plastic metallic gasket 10.

Strong connections are provided between the several opposed cylinders.

The connections, constituted by bolts 11, effect on the one hand assembly of the two half-casings 12 and 13 (Fig. 2) by tightening nuts 14, and on the other hand the same bolts 11 hold the blocks of the cylinders $2^1\ 2^2$ . . . by tightening end nuts 15.

The end nuts 15 simultaneously hold the head 9 on the rims of the cylinders $2^1$ $2^2$ . . . and hold the opposite rims of these cylinders $2^1$ $2^2$ on the flange 16 of the casing 12, 13.

As a result of the above arrangement, the shock of explosion imparted to each cylinder head is transmitted to the bearings 6 through the bolts 11. These bolts 11 which tightly bind the casing 12, 13 on assembly, alone bear the tension developed as above described, the casing 12, 13 being thus relieved of this stress.

It will be observed moreover that when the explosion stroke is taking place in one cylinder $2^1$, compression or exhaust is occurring in the opposing cylinder $2^1$, the respective crank-pin $1^1$ is subject to a force which is the difference between the two forces transmitted by the two opposed connecting rods $51^1$ $51^2$, whereby the stress to which the bearings $6^1$ $6^2$ . . . of the driving crank-shaft 1 are subjected is diminished.

Figure 3:
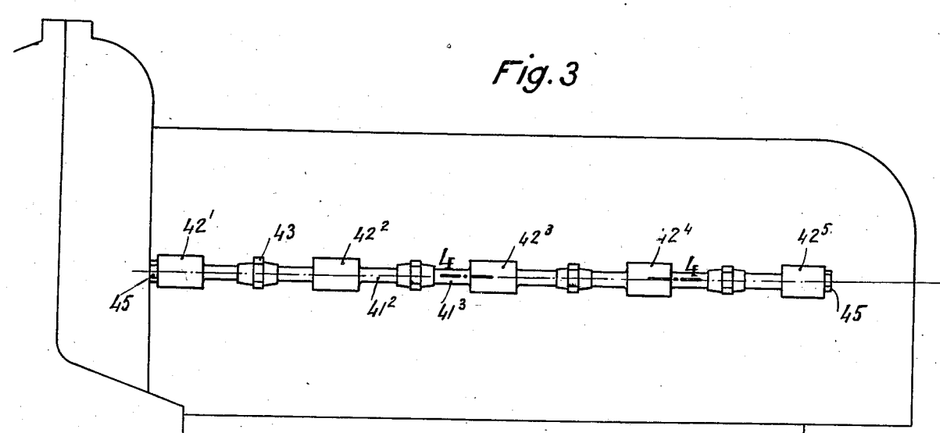
Fig. 3 is a partial lateral view of the engine.
Figure 4:
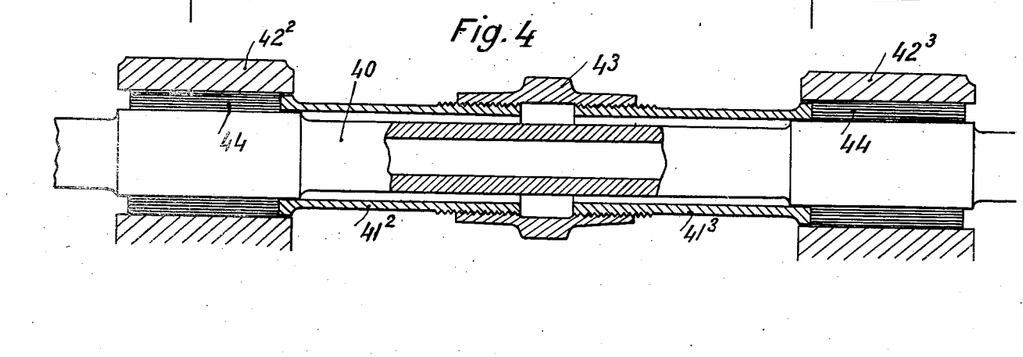
Fig. 4 is a partial section on the line 4—4 of Fig. 3.
Figure 5A:
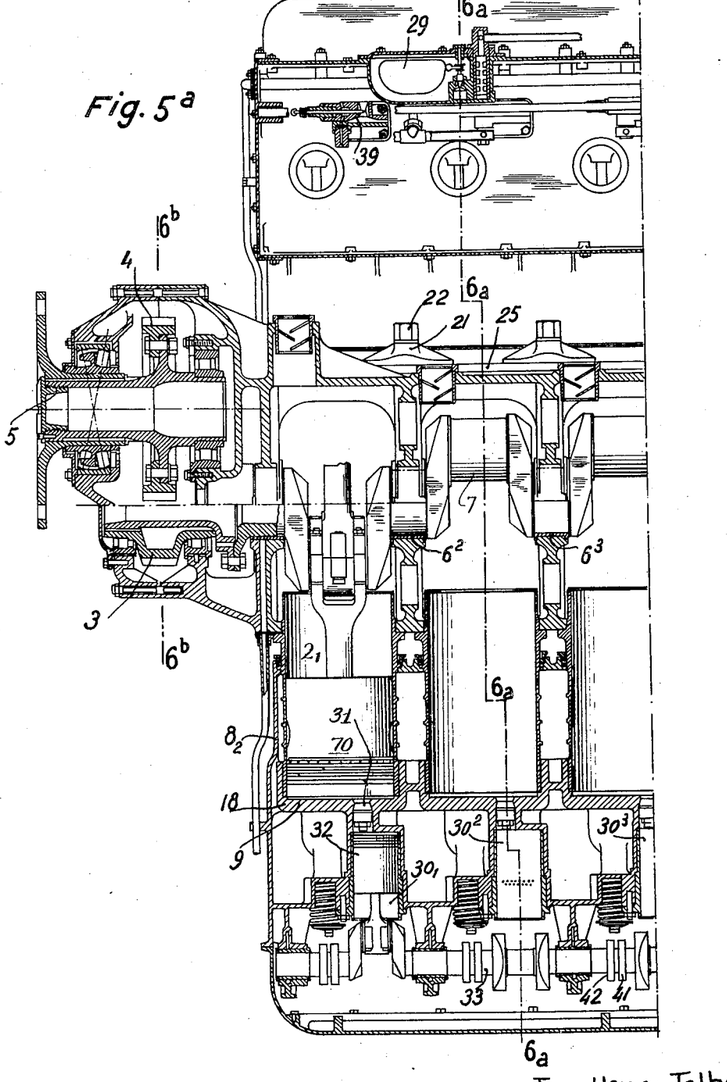
Figs. 5a and 5b are the two halves of a longitudinal section of an aircraft engine according to a variant of the invention, the section being on the diverted line 5—5—5—5 of Fig. 6.
Figure 5B:
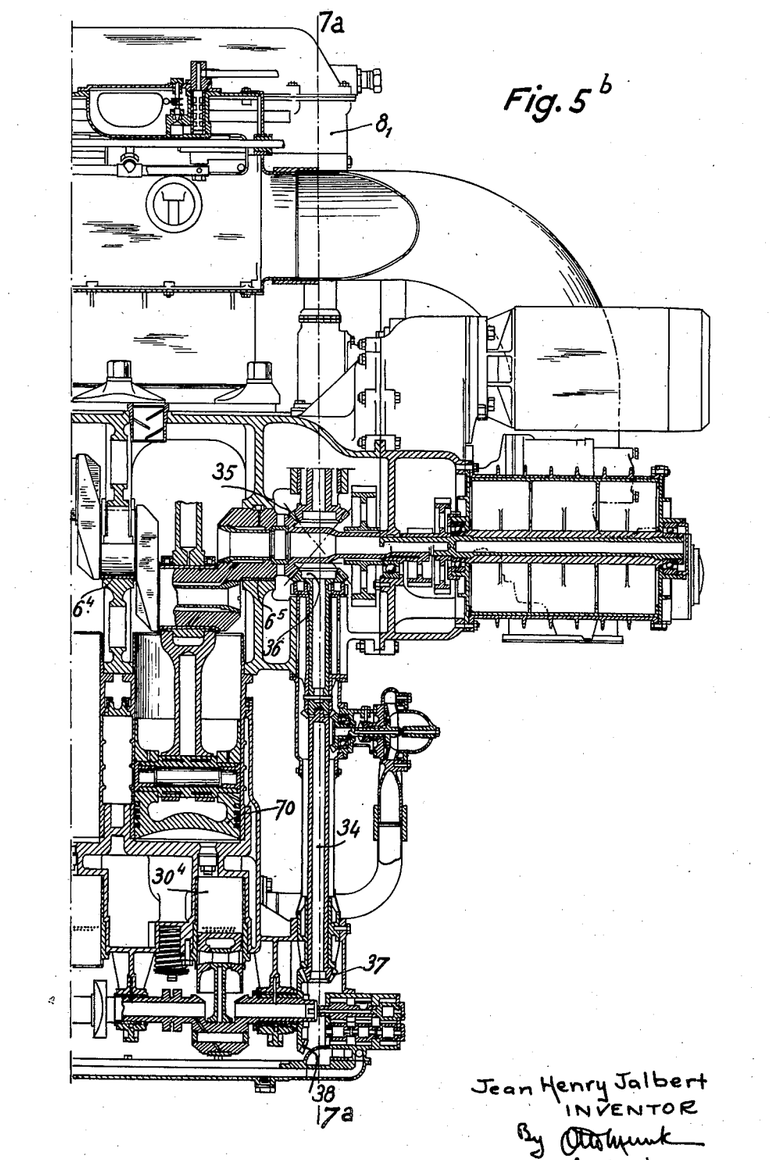
Figure 6:
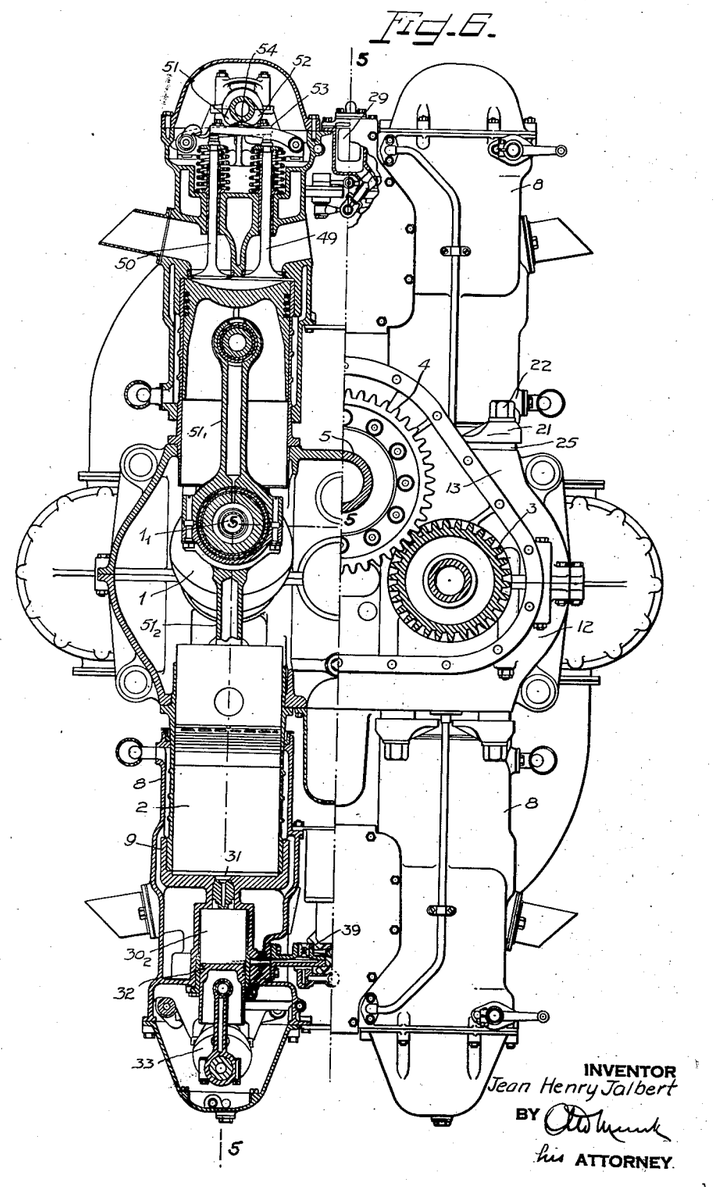
Figure 7:
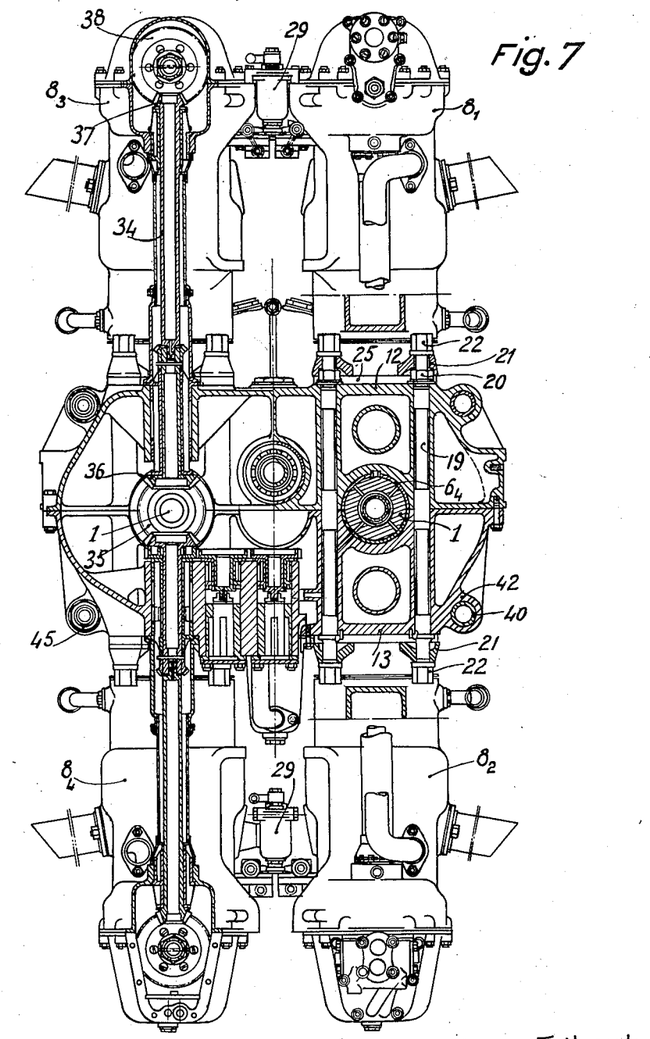
Fig. 7 is a transverse section of the engine of Figs. 5a, 5b and 6 viewed from the rear end on the line 7a—7a of Fig. 5b for the left-hand portion, the right-hand portion being a section taken on a different level to show otherwise hidden parts of the engine.
Figure 8:
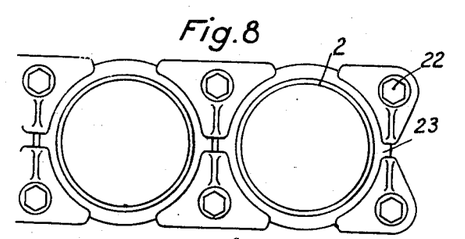
Fig. 8 is a plan view of a portion of a row of cylinders.
Figure 9:
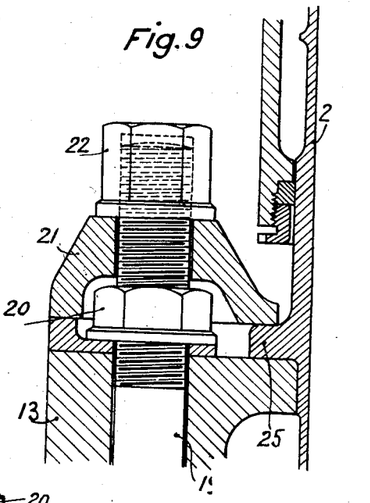
Fig. 9 is a vertical section on an enlarged scale of a nut assembly of Fig. 7.

Longitudinal rigidity of the casing is ensured by strong steel tubes 40 which extend from end to end of the engine and are tensioned by end nuts 45, whereby the casing is tightly bound longitudinally. The steel tubes 40 extend through half-sleeves $41^2$ $41^3$ forming struts between two adjacent webs or annular bosses of the casing (Figs. 3 and 4). The half-sleeves, interconnected by a nut 43 screw-threaded at both ends, in moving apart compress a rubber annulus 44 forming a shock-absorbing joint. This mode of assembly using longitudinal tie-rods effectively opposes bending along the line of the shaft and maintains the assembled members in their correct operative position.

Moreover the longitudinal tubes 40 can advantageously be used in mounting the engine on the chassis.

The aircraft engine shown in Figs. 5a, 5b, 6, and 7 has the same constructional features as the engine shown in Figs. 1a to 4.

Each of the cylinders $2^1$ $2^2$ is enclosed by a jacket 8 for the circulation of cooling water. The working cylinders 2 screw into the cylinder head 9 cast with the jacket 8.

The shock of explosion is transmitted by the steel cylinder 2 to its base on the casing.

The two half-casings 12 and 13 are joined one to the other by tightening nuts 20 on bolts 19 (Figs. 5a to 9).

Steel bridge-pieces 21 are threaded over the ends of the bolts 19 and bear on a retaining flange 25 on the cylinders 2. Consequently, the shock of explosion imparted to the cylinder head 9 is transmitted along the cylinder 2, by the steel composing the cylinder, then by the bridge-piece 21, to the bolt 19 and to the line of the shaft.

There are thus provided injection engines which for a given power have a reduced weight and maximum mechanical strength.

Figure 10:
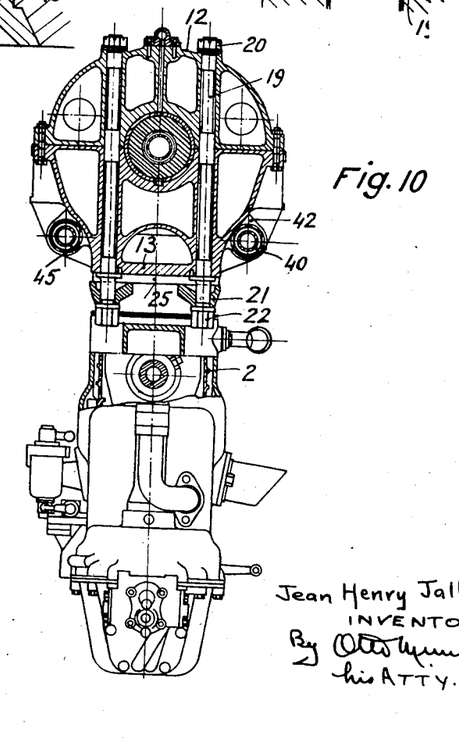
Fig. 10 is a transverse section of an engine having aligned inverted cylinders.

The same mode of construction can be applied moreover to an engine having a single line of cylinders such as is shown in Fig. 10, which shows an injection engine having a line of inverted cylinders and injection cylinders compressing a rich fuel and air mixture. The bolts 19 connect the two casings 12 and 13 by tightening nuts 20. The cylinder 2 is fixed to the casing 13 by tightening the bridge-piece 21, by means of the nut 22, against the base 25 of the cylinder.

The longitudinal tubes 40 threaded through the bosses 42 and held by the nuts 45 fulfil the same purpose as in the sixteen cylinder motor described above and are mounted in a similar manner.

The invention also includes a distributing device interposed between the injection cylinder 32 and the working cylinder $2^1$.

Figure 11:
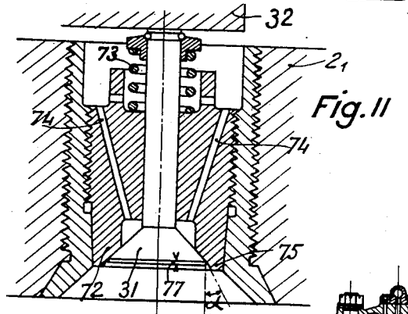
Fig. 11 shows on an enlarged scale the valve arrangement for injecting the rich fuel and air mixture from the injection cylinder into the working cylinder.

The valve 31 of the distributing device resting on its seat 72 is maintained in place by its spring 73 and thus closes the recessed chamber into which the injection passages 74 open (see Fig. 11). The seating 72 extends by an inclined surface 75 beyond the valve and the wall of the working cylinder. The cone of angle $\alpha$ thus mechanically provided and different from the cone formed by the seating proper, enables the designer to direct the mixture injected into the air in the combustion chamber so that an as homogeneous as possible distribution of fuel mixture occurs in the chamber and consequently the combustion is as uniform as possible.

Moreover the valve 31 has a cylindrical extension 77 which cooperates with the inclined extension 75 to guide and distribute the fuel mixture in the combustion chamber.

I claim:

1. In an internal combustion engine, a casing consisting of two pieces disposed one upon the other to form a joint, cylinders arranged in oppositely disposed pairs and having a common perpendicular axis with respect to the joint of the casing, each cylinder being provided at its open end with a flange attached to the casing, a piston, a plurality of bridge pieces, each bridge piece being attached to the flanges of two adjacent cylinders, bolts disposed parallel to the axes of the cylinders and connected to the two pieces of the casing and the bridge pieces, lock nuts provided at the ends of said stay bolts and attached to the bridge pieces.

2. In an internal combustion engine, a casing, motor cylinders arranged in oppositely disposed pairs, each cylinder being provided with a flange on its open edge, said flange being attached to the casing, a piston mounted in each cylinder, a plurality of bearings being mounted on the casing, a crank shaft provided with crank pins mounted in the said bearings each crank pin of the crank shaft being common to two oppositely disposed pistons, a plurality of bridge pieces, each of said bridge pieces being attached to the flanges of two adjacent cylinders, stay bolts disposed parallel to the axes of the cylinders and connected to the bridge pieces, a plurality of retaining nuts provided at the ends of the said stay bolts and attached to the said bridge pieces, tubular stay bolts attached in a longitudinal direction to the casing means for reenforcing the tubular stay bolts and the casing in a transverse direction, nuts provided on the ends of the tubular stay bolts and resting upon the casing.

3. In an internal combustion engine, a casing comprising hollow exterior bosses, cylinders arranged in oppositely disposed pairs, each cylinder being provided at its open end with a flange attached to the casing, a piston mounted in each cylinder, bearings mounted in the casing, a crank shaft provided with crank pins mounted in the said bearings each crank pin of the crank shaft being common to two oppositely disposed pistons, a plurality of transverse stay bolts having axes disposed parallel to the axes of the cylinders and resting upon the flanges of the open ends of the cylinders, sleeves forming struts and arranged between said hollow bosses and the sleeves, nuts provided with an inversely threaded bore disposed on the said sleeves, a plurality of tubular stay bolts disposed in the hollow bosses and in the sleeves, nuts screwed onto the tubes and resting upon the outermost bosses.

4. In an internal combustion engine, a casing, motor cylinders arranged in oppositely disposed pairs mounted on said casing, each cylinder being provided with a flange on its open edge, said flange being attached to the casing, a piston mounted in each cylinder, a plurality of bearings mounted on the casing, a crank shaft provided with crank pins mounted in the said bearings each crank pin of the crank shaft being common to two oppositely disposed pistons, a plurality of bridge pieces each of said bridge pieces being attached to the flanges of two adjacent cylinders, stay bolts disposed parallel to the axes of the cylinders and connected to the bridge pieces, a plurality of retaining nuts provided at the ends of the said stay bolts and attached to the said bridge pieces said stay bolts being tensioned by means of nuts which traverse the casing in a longitudinal direction from one end to the other and assure rigidity of the construction and form a support for the engines.

JEAN HENRY JALBERT.